(12) United States Patent
Chen

(10) Patent No.: US 11,835,738 B2
(45) Date of Patent: Dec. 5, 2023

(54) AUTOSTEREOSCOPIC HEAD-UP DISPLAY DEVICE USING TWO DIRECTIONAL BACKLIT DISPLAYS

(71) Applicant: E-LEAD ELECTRONIC CO., LTD., Changhua (TW)

(72) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 358 days.

(21) Appl. No.: 17/444,872

(22) Filed: Aug. 11, 2021

(65) Prior Publication Data
US 2022/0342230 A1    Oct. 27, 2022

(30) Foreign Application Priority Data

Apr. 21, 2021   (TW) .................................. 110114298

(51) Int. Cl.
| | | |
|---|---|---|
| *G02B 30/33* | (2020.01) | |
| *G02B 27/01* | (2006.01) | |
| *G02B 27/28* | (2006.01) | |
| *G02B 27/04* | (2006.01) | |
| *G02B 27/14* | (2006.01) | |

(52) U.S. Cl.
CPC ......... *G02B 30/33* (2020.01); *G02B 27/0101* (2013.01); *G02B 27/14* (2013.01); *G02B 27/283* (2013.01); *G02B 2027/0134* (2013.01)

(58) Field of Classification Search
CPC ........ G02B 30/26; G02B 30/27; G02B 30/30; G02B 30/56; G02B 30/33; G02B 27/0101; G02B 27/14; G02B 27/283; G02B 27/017; G02B 27/0172; G02B 27/01; G02B 2027/0134; G02B 2027/0118
USPC ....................................................... 359/475
See application file for complete search history.

(56) References Cited

U.S. PATENT DOCUMENTS

| | | | | |
|---|---|---|---|---|
| 2019/0033583 A1* | 1/2019 | Chauveau | ............ | G02B 27/144 |
| 2021/0382304 A1* | 12/2021 | You | ....................... | G02B 27/283 |

FOREIGN PATENT DOCUMENTS

| | | | | |
|---|---|---|---|---|
| CN | 108919494 B | * | 2/2021 | ......... G02B 27/0101 |
| WO | WO-2022181274 A1 | * | 9/2022 | ............. G02B 30/56 |

* cited by examiner

*Primary Examiner* — Stephone B Allen
*Assistant Examiner* — Jyotsna V Dabbi
(74) *Attorney, Agent, or Firm* — Wang Law Firm, Inc.

(57) ABSTRACT

An autostereoscopic head-up display device includes two directional backlit type displays, a first reflector, a second reflector, a third reflector and a beam splitter. The two displays emit two image light beams with directivity, respectively, and the two image light beams are parallax image light for a viewer's eyes. One of the two displays, the first reflector, the beam splitter, the windshield and one of the viewer's eyes form a first light path, and the other one of the two displays, the second reflector, the beam splitter, the third reflector, the windshield and the other one of the viewer's eyes form a second light path. The two image light beams are projected onto the viewer's eyes through the first and second light paths, to form a stereoscopic image.

10 Claims, 20 Drawing Sheets

AUTOSTEREOSCOPIC HEAD-UP DISPLAY DEVICE USING TWO DIRECTIONAL BACKLIT DISPLAYS

BACKGROUND

Field of the Invention

The present invention relates to a head-up display, and more particularly to an autostereoscopic head-up display device using two directional backlit displays.

Description of Related Art

In the conventional head-up display technology, the digital light processing (DLP) projection display of the reflective display or the thin film transistor liquid crystal display (TFT-LCD) of the backlit display can be used. However, the DLP projection display has a complex structure, high cost, and large volume, and if it has the same resolution as the LCD screen, the price of DLP projection display is even more expensive. Therefore, the LCD screen is a better choice when considering small size, low cost, high contrast and high resolution.

Common autostereoscopic technologies that use liquid crystal displays can be divided into the use of lenticular lenses and the use of parallax barriers. As shown in FIG. 1A, the lenticular lens type uses the focusing and light refraction of the closely arranged lenticular lenses to change the traveling direction of the image light to achieve the purpose of splitting the left and right eye images. As shown in FIG. 1B, the parallax barrier uses longitudinal grating linear stripes, formed by alternately arranging light-transmitting slits and light-impermeable barriers, to limit the travel route of the image light and achieve the purpose of splitting the left and right eye images.

Both the lenticular lens type and the parallax barrier type need to divide the image information into equidistant vertical strips, and then display the left-eye images and the right-eye images in an interleaved manner, which results in the disadvantage of halving the horizontal resolution. Furthermore, the alignment accuracy between the pixels on the liquid crystal panel is extremely demanding, so the problem of poor separation of images for the left and right eyes is likely to occur. Moreover, the parallax barrier technology has the disadvantage of halving the brightness. These will affect the visual quality.

Therefore, an autostereoscopic head-up display using two LCD screens can avoid the aforementioned shortcomings of halving the resolution, high alignment accuracy requirement, and halving the brightness. In the existing dual-screen LCD head-up display technology, as shown in FIG. 2A, a liquid crystal display P0 used to project image light is divided into two areas, and the two areas project two image light beams respectively, or as shown in FIG. 2B, two liquid crystal displays P1 and P2 are used to project two image light beams respectively. The two image light beams are projected on the eyes of the viewer through their light paths to form virtual images V1 and V2 at two different focal planes in front of the windshield, as shown in FIG. 3.

As shown in FIG. 4, in order to present autostereoscopic images, the head-up display uses two liquid crystal displays P1 and P2 to project left-eye and right-eye parallax image light beams respectively, and further uses two independent concave mirrors B1 and B2 to split light and adjust the magnification, so that the two parallax virtual images V1 and V2 in front of the windshield are imaged at the same or similar distances from the eyes, and projected on the left and right eyes of the viewer respectively to be combined into a stereoscopic image in the viewer's mind, thus achieving an autostereoscopic effect. However, the optical design of this stereoscopic image will cause the eye box to be too large due to the wide viewing angles of the LCD P1 and P2, and cause the poor isolation between the two approximately parallel light paths resulting in light leakage and cross talk problems, which seriously affects the visual quality of viewing.

SUMMARY

One objective of the present invention is to provide an auto-stereoscopic head-up display device using two directional backlit displays, and the head-up display device may enable that, with the use of directional backlit displays, the single eye box covers only a single eye, and is able to, plus with the design of staggered light paths, prevent light leakage and crosstalk caused by the poor isolation of light paths.

An autostereoscopic head-up display device using two directional backlit displays in accordance with an embodiment of the invention, includes: a first directional backlit display configured to provide a first image light beam with directivity; a second directional backlit display configured to provide a second image light beam with directivity, wherein the first image light beam and the second image light beam are parallax image light beams to be respectively projected on eyes of a viewer; a first reflector; a second reflector; a third reflector; and a beam splitter located between the first reflector, second reflector and the third reflector; wherein the first directional backlit display, the first reflector, the beam splitter, a windshield, and one of the viewer's eyes form a first light path, the first image light beam projected by the first directional backlit display is projected to one of the viewer's eyes via the first light path to form a parallax virtual image; the second directional backlit display, the second reflector, the beam splitter, the third reflector, the windshield and the other of the viewer's eyes form a second light path, the second image light beam projected by the second directional backlit display is projected to the other of the viewer's eyes via the second light path to form another parallax virtual image, the two parallax virtual images together form a stereoscopic image in the viewer's vision; and the first light path and the second light path between the beam splitter, the first reflector and the second reflector are not in parallel with each other.

In some embodiments of the invention, the first light path and the second light path between the beam splitter, the first reflector and the second reflector are not in parallel and intersect each other.

In some embodiments of the invention, the first light path and the second light path between the beam splitter, the first reflector and the second reflectors are not in parallel and do not intersect each other.

In some embodiments of the invention, the first light path and the second light path between the first and second directional backlit displays and the first and second reflectors are not in parallel and intersect each other.

In some embodiments of the invention, the first light path and the second light path between the first and second directional backlit displays and the first and second reflectors are not in parallel and do not intersect each other.

In some embodiments of the invention, the first light path and the second light path have at least a part of them not overlap before reaching the windshield. They are not in parallel and intersect each other, or they are not in parallel and do not intersect each other.

In some embodiments of the invention, the beam splitter is a reflective polarizer, and the first image light beam and the second image light beam projected to the beam splitter are image light beams whose polarization directions are orthogonal to each other.

In some embodiments of the invention, the beam splitter is a semi-reflective mirror, and the first image light beam and the second image light beam projected to the beam splitter are unpolarized image light beams.

In some embodiments of the invention, a distance from the first directional backlit display to the first reflector is D1, a distance from the second directional backlit display to the second reflector is D2, a distance from the first reflector to the beam splitter is S1, a distance from the second reflector to the third reflector is S2, a distance from the beam splitter to the windshield is R1, a distance from the third reflector to the windshield is R2, a magnification of the beam splitter is A1, a magnification of the third reflector is A2, a magnification of the windshield is GA, and the autostereoscopic head-up display device satisfies the following condition:

$$[(D1+S1) \times A1+R1] \times GA = [(D2+S2) \times A2+R2] \times GA.$$

In some embodiments of the invention, the first directional backlit display and the second directional backlit display each include a liquid crystal panel and a directional backlight source.

In some embodiments of the invention, the first directional backlit display projects the first image light beam to the first reflector, the first reflector reflects the first image light beam to the beam splitter, the beam splitter reflects the first image light beam to the windshield, and the windshield then reflects the first image light beam to one of the viewer's eyes to form the parallax virtual image. The second directional backlit display projects the second image light beam to the second reflector, the second reflector reflects the second image light beam to the beam splitter, the second image light beam passes through the beam splitter and then travels to the third reflector, the third reflector reflects the second image light beam to the beam splitter, and the second image light beam from the third reflector passes through the beam splitter again and then travels to the windshield, and the windshield then reflects the second image light beam to the other eye of the viewer's eyes to form the another parallax virtual image.

In this way, the autostereoscopic head-up display device using two directional backlit displays provided by the present invention, through the design of staggered light paths, can enhance the isolation between the light paths, thereby avoiding light leakage and crosstalk.

BRIEF DESCRIPTION OF THE DRAWINGS

After studying the detailed description in conjunction with the following drawings, other aspects and advantages of the present invention will be discovered.

DETAILED DESCRIPTION

Figure 1A:
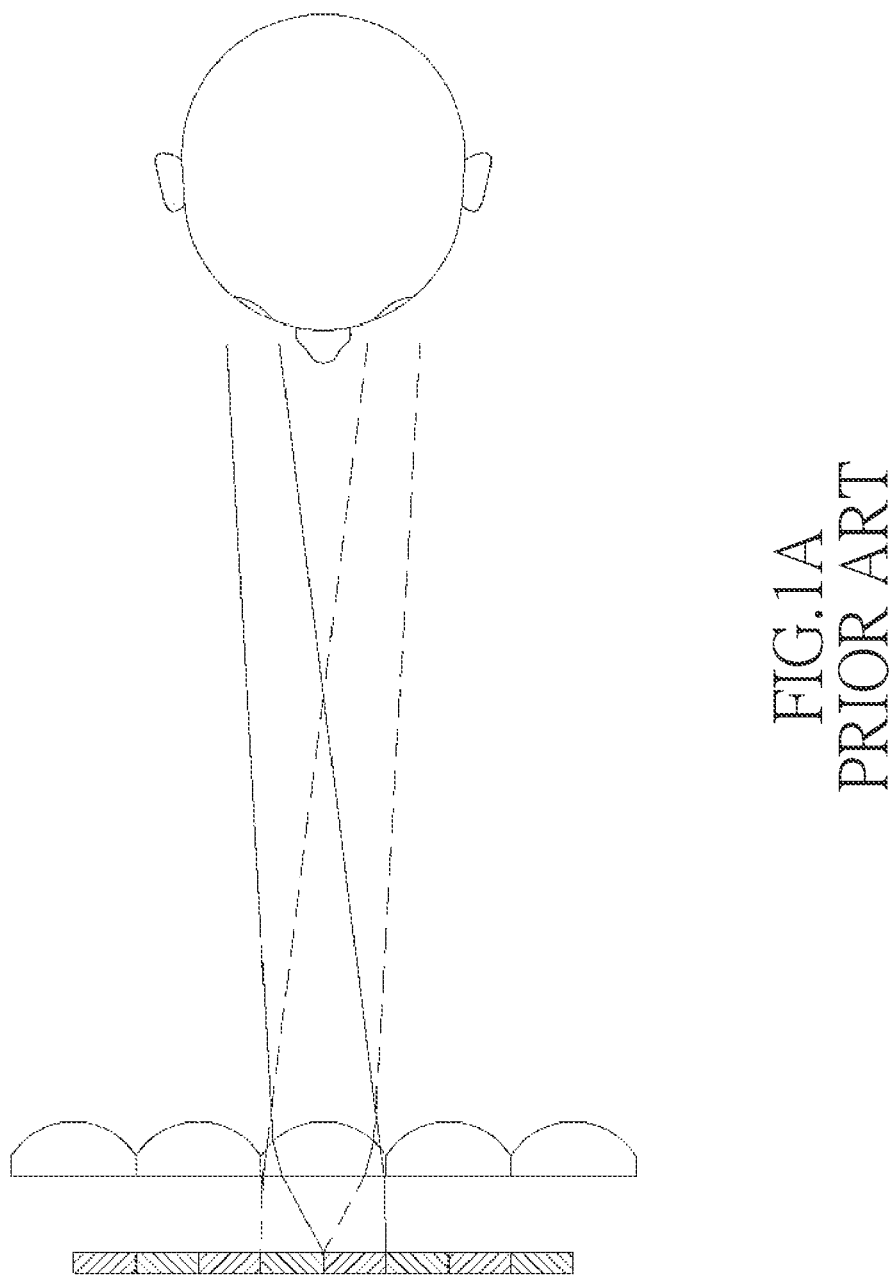
FIG. 1A is a schematic diagram of the structure of an existing autostereoscopic display with a lenticular lens type liquid crystal screen.
Figure 1B:
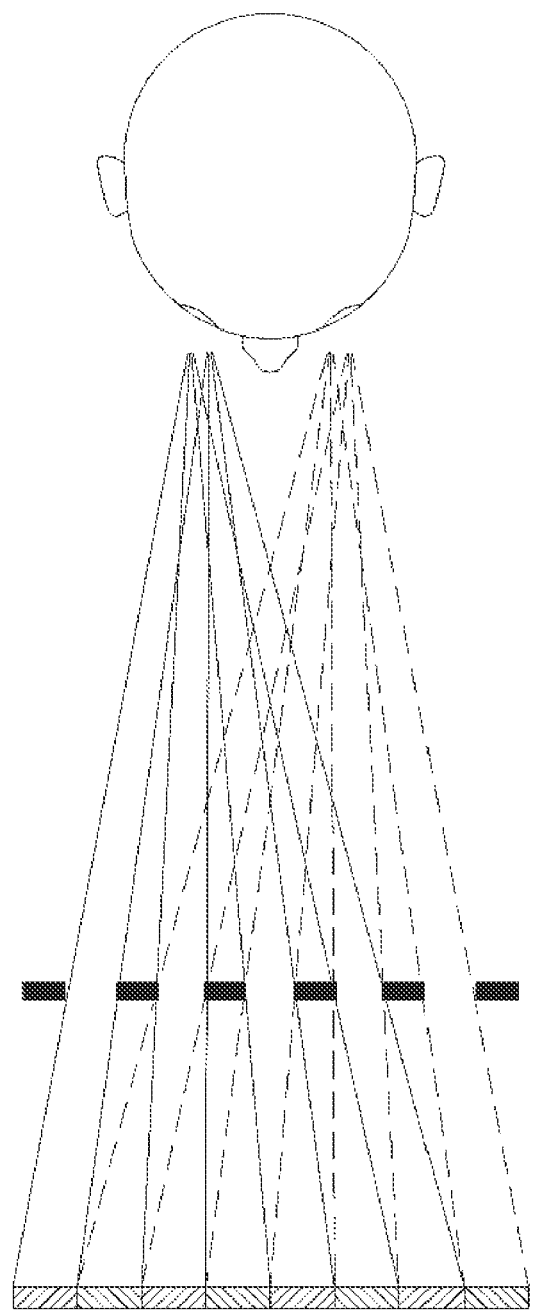
FIG. 1B is a schematic diagram of the structure of an existing autostereoscopic display with a parallax barrier liquid crystal screen.
Figure 2A:
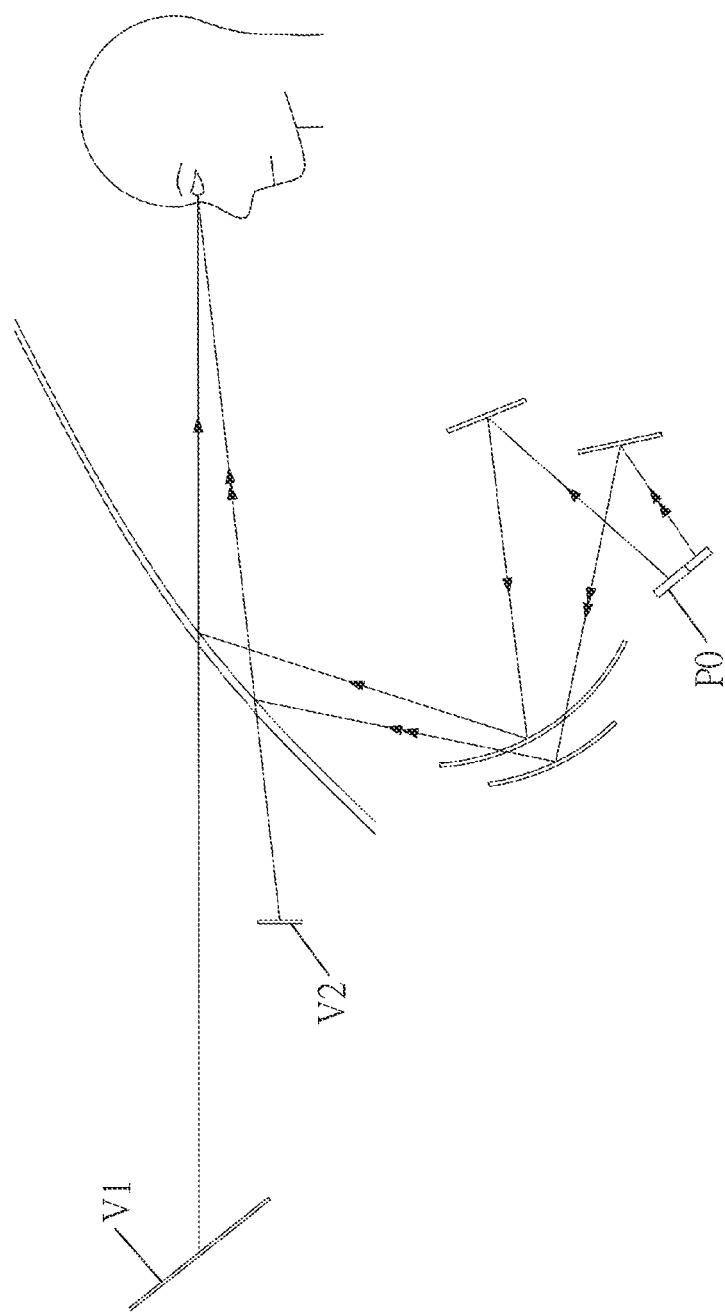
FIG. 2A is a schematic diagram of the structure of an existing dual-screen LCD head-up display.
Figure 2B:
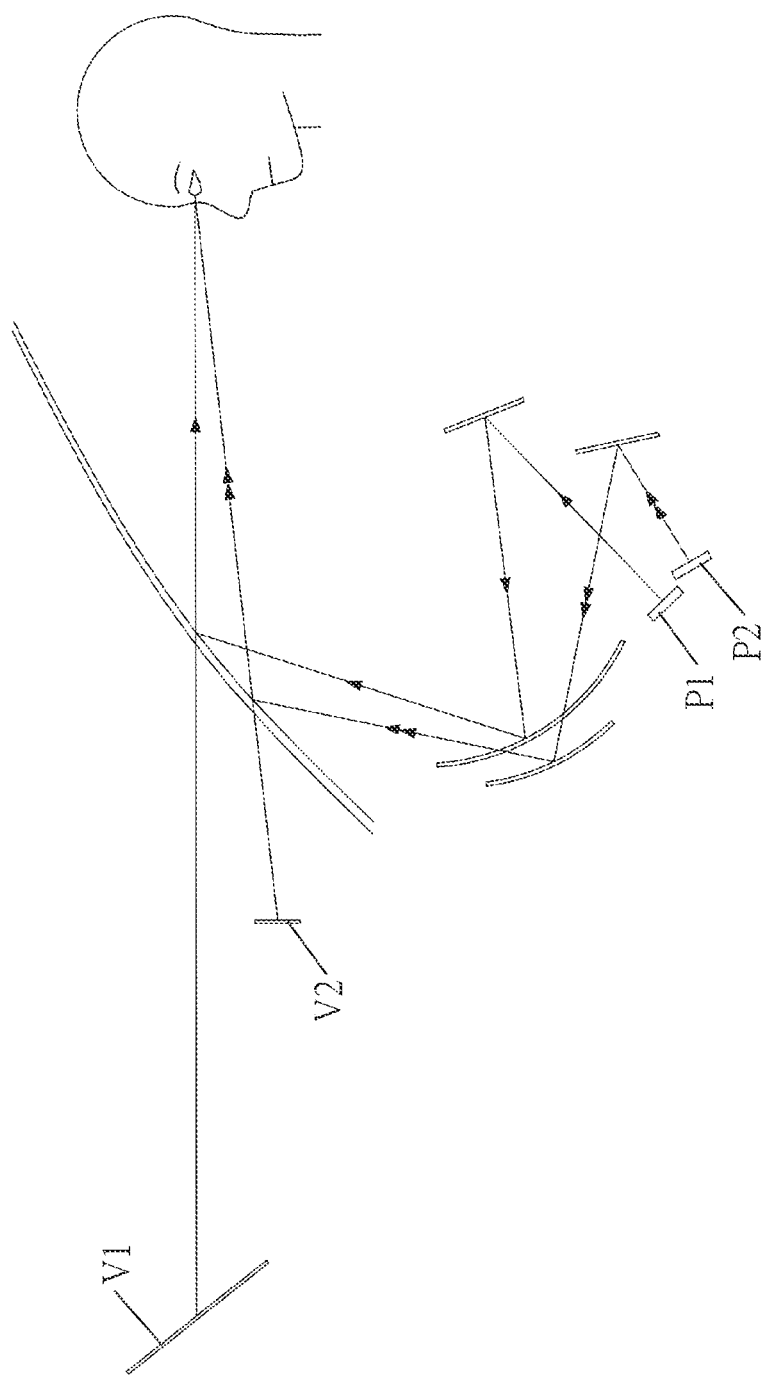
FIG. 2B is a schematic diagram of the structure of another existing dual-screen LCD head-up display.
Figure 3:
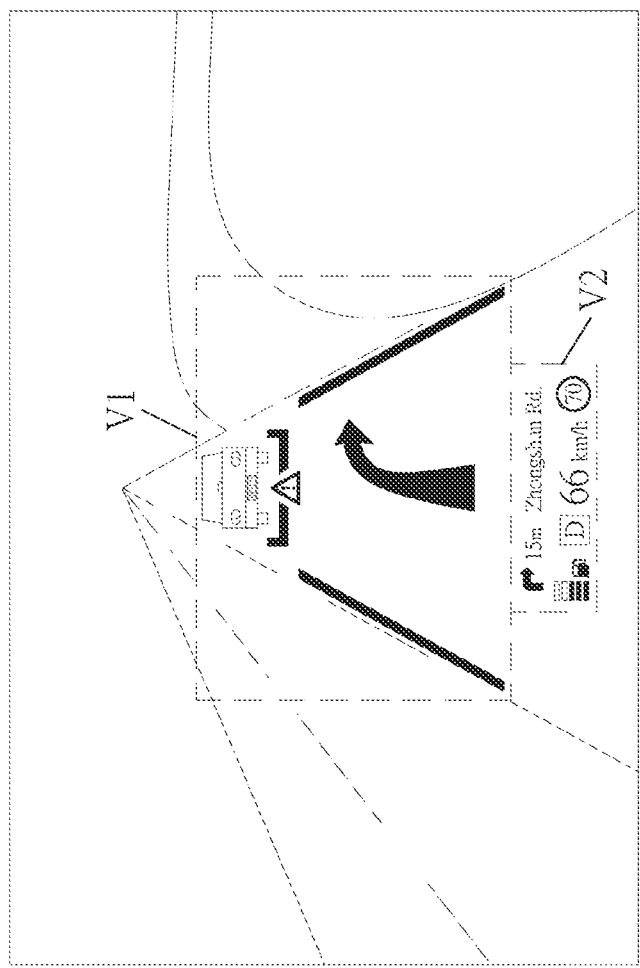
FIG. 3 is a schematic diagram showing two virtual images formed by the existing dual-screen LCD head-up display in front of the windshield.
Figure 4:
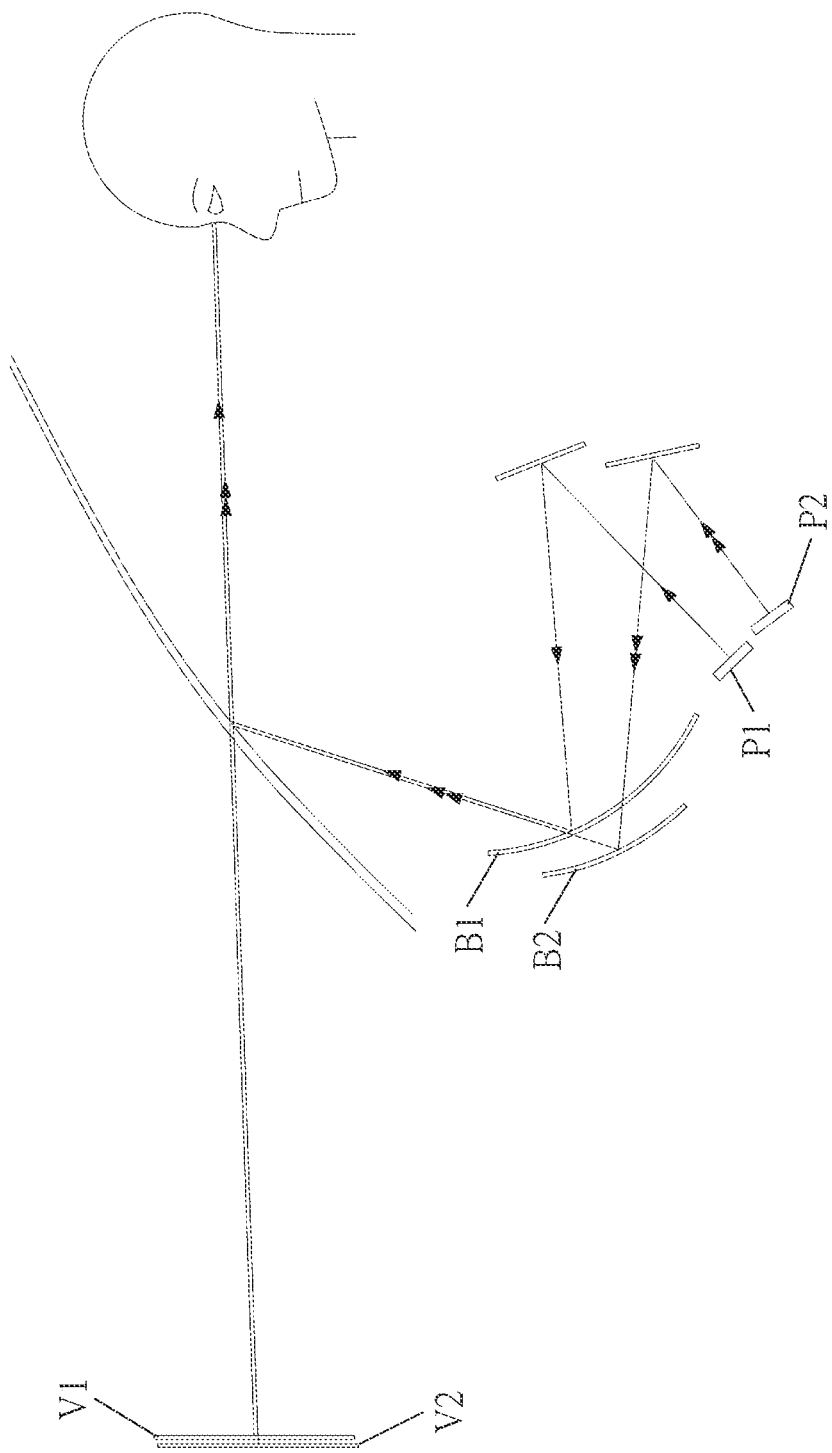
FIG. 4 is a schematic diagram of the structure of an existing dual-liquid crystal screen auto-stereoscopic head-up display.
Figure 5:
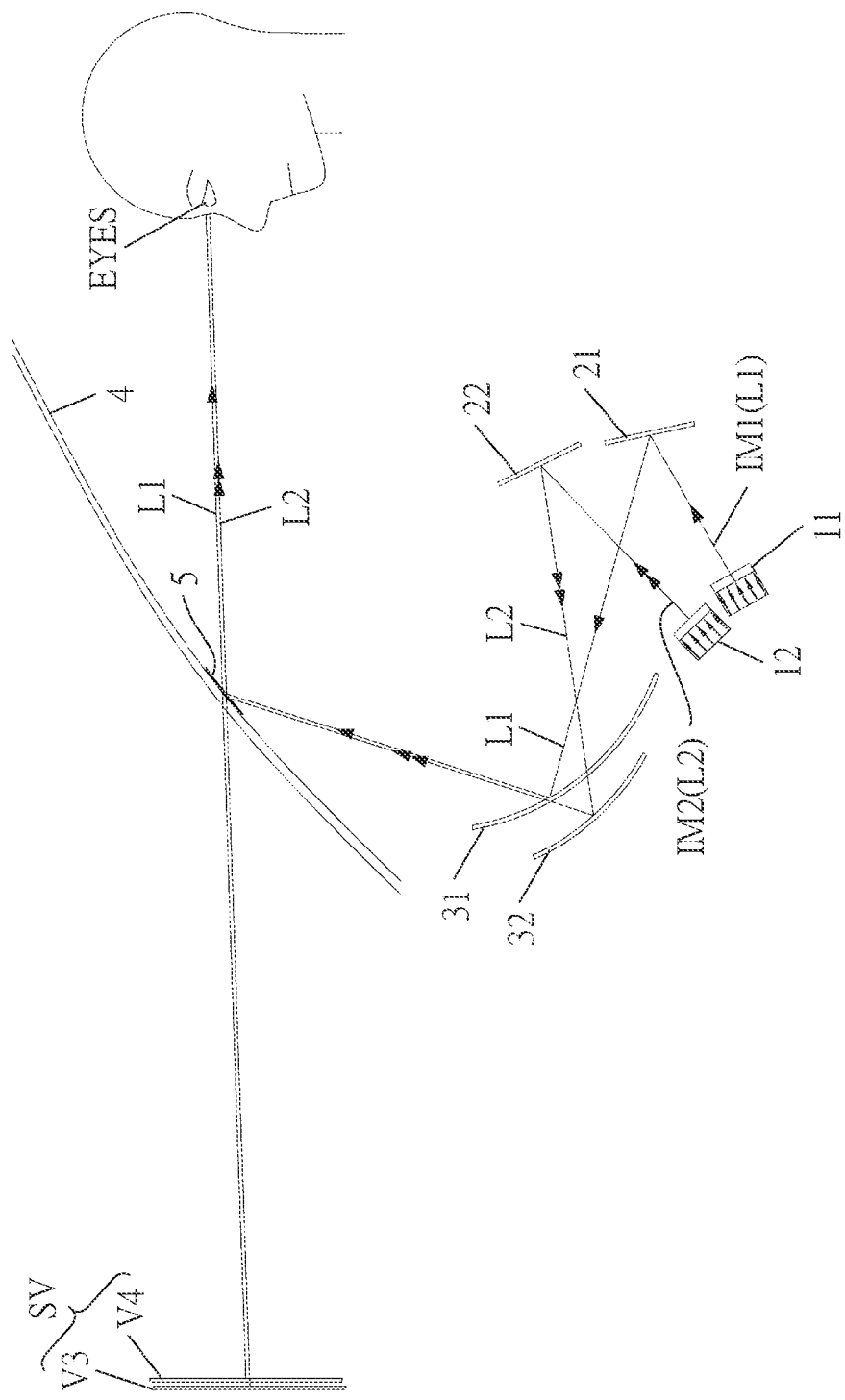
FIG. 5 is a schematic diagram of an autostereoscopic head-up display device using two directional backlit displays according to an embodiment of the present invention.

Please refer to FIG. 5, where an embodiment of the present invention provides an autostereoscopic head-up display device using two directional backlit displays, and the head-up display device includes a first directional backlit display 11, a second directional backlit display 12, a first reflector 21, a second reflector 22, a beam splitter 31 and a third reflector 32. The positions of these elements in the arrangement can be, for example, as shown in FIG. 5, where the beam splitter 31 is located between the first directional backlit display 11, the second directional backlit display 12 and the third reflector 32.

Figure 6:
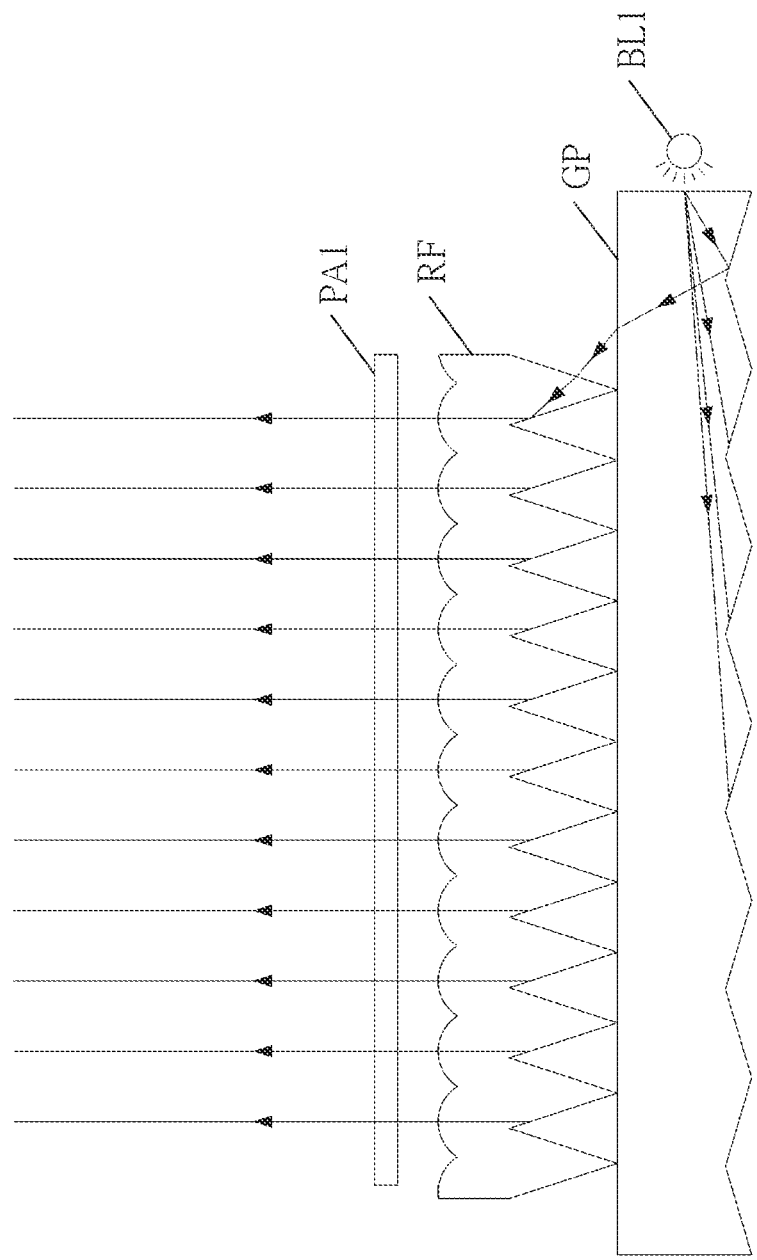
FIG. 6 is a schematic diagram of the structure of a display with a directional backlight module including an edge light source.
Figure 7:
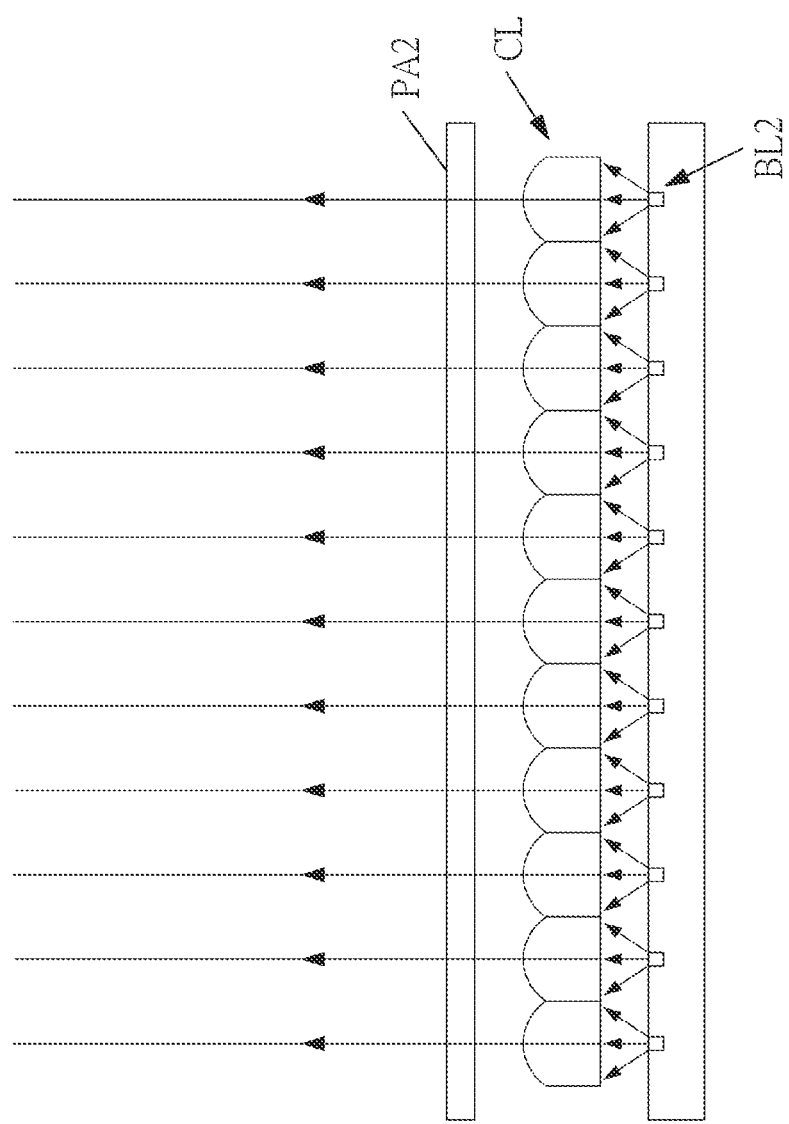
FIG. 7 is a schematic diagram of the structure of a display with a directional backlight module including a dot-array light source.

The first directional backlit display 11 is used to provide (i.e., emit or project) a first image light beam IM1 with directivity. The second directional backlit display 12 is used to provide (i.e., emit or project) a second image light beam IM2 with directivity. The first image light beam IM1 and the second image light beam IM2 are parallax image light beams to be respectively projected on the eyes of a viewer. The first directional backlit display 11 and the second directional backlit display 12 may, for example, but not limited to, each include a liquid crystal panel and a directional backlight. For example, the liquid crystal panels used in the first directional backlit display 11 and the second directional backlit display 12 may be twisted nematic liquid crystal (TN), vertical alignment liquid crystal (VA), In-Plane Switching (IPS), or any liquid crystal panels that require an external light source, rather than self-luminous liquid crystal panels. The backlight modules used in the first directional backlit display 11 and the second directional backlit display 12, as shown in FIG. 6, can be a combination of a conventional edge light source BL1, a light guide plate GP having a wedge structure, and a redirecting film RF with a prismatic structure, and the light outputted from the backlight module travels forward straightly and passes through the liquid crystal panel PA1 to form an image light beam with high directivity and a narrow viewing angle. Or, as shown in FIG. 7, in the backlight module, the light source can be a conventional dot array light source BL2, and cooperate with a convex lens array CL, so that the light outputted from the backlight module travels forward straightly and passes through the liquid crystal panel PA2 to form an image light beam with high directivity and a narrow viewing angle.

In this embodiment, the first reflector 21 and the second reflector 22 are both flat, but the present invention is not limited to this embodiment. In other embodiments, the first reflector 21 and the second reflector 22 may be curved; and alternatively, one of the first reflector 21 and the second reflector 22 is flat, and the other of the first reflector 21 and the second reflector 22 is curved.

In this embodiment, both the beam splitter 31 and the third reflector 32 are curved, but the present invention is not limited to this embodiment. In other embodiments, the beam splitter 31 and the third reflector 32 may both be flat; or, one of the beam splitter 31 and the third reflector 32 is flat, and the other of the beam splitter 31 and the third reflector 32 is curved.

In this embodiment, the beam splitter 31 is a reflective polarizer. Under this premise, the first image light beam IM1 and the second image light beam IM2 projected to the beam splitter 31 are image light beams whose polarization directions are orthogonal to each other.

The first directional backlit display 11, the first reflector 21, the beam splitter 31, the windshield 4, and one of the viewer's eyes form a first light path L1. In detail, the first directional backlit display 11 projects the first image light beam IM1 to the first reflector 21, the first reflector 21 reflects the first image light beam IM1 to the beam splitter 31, the beam splitter 31 reflects the first image light beam IM1 to the windshield 4, and the windshield 4 then reflects the first image light beam IM1 to one of the viewer's eyes (such as, but not limited to, the left eye) to form a parallax virtual image.

The second directional backlit display 12, the second reflector 22, the beam splitter 31, the third reflector 32, the windshield 4 and the other of the viewer's eyes form a second light path L2. In detail, the second directional backlit display 12 projects the second image light beam IM2 to the second reflector 22, the second reflector 22 reflects the second image light beam IM2 to the beam splitter 31, the second image light beam IM2 passes through the beam splitter 31 and travels to the third reflector 32, the second image light beam IM2 is reflected by the third reflector 32 to the beam splitter 31 and passes through the beam splitter 31 again and then travels to the windshield 4, and the windshield 4 then reflects the second image light beam IM2 to the other eye (such as, but not limited to, the right eye) of the viewer's eyes to form another parallax virtual image.

Figure 14:
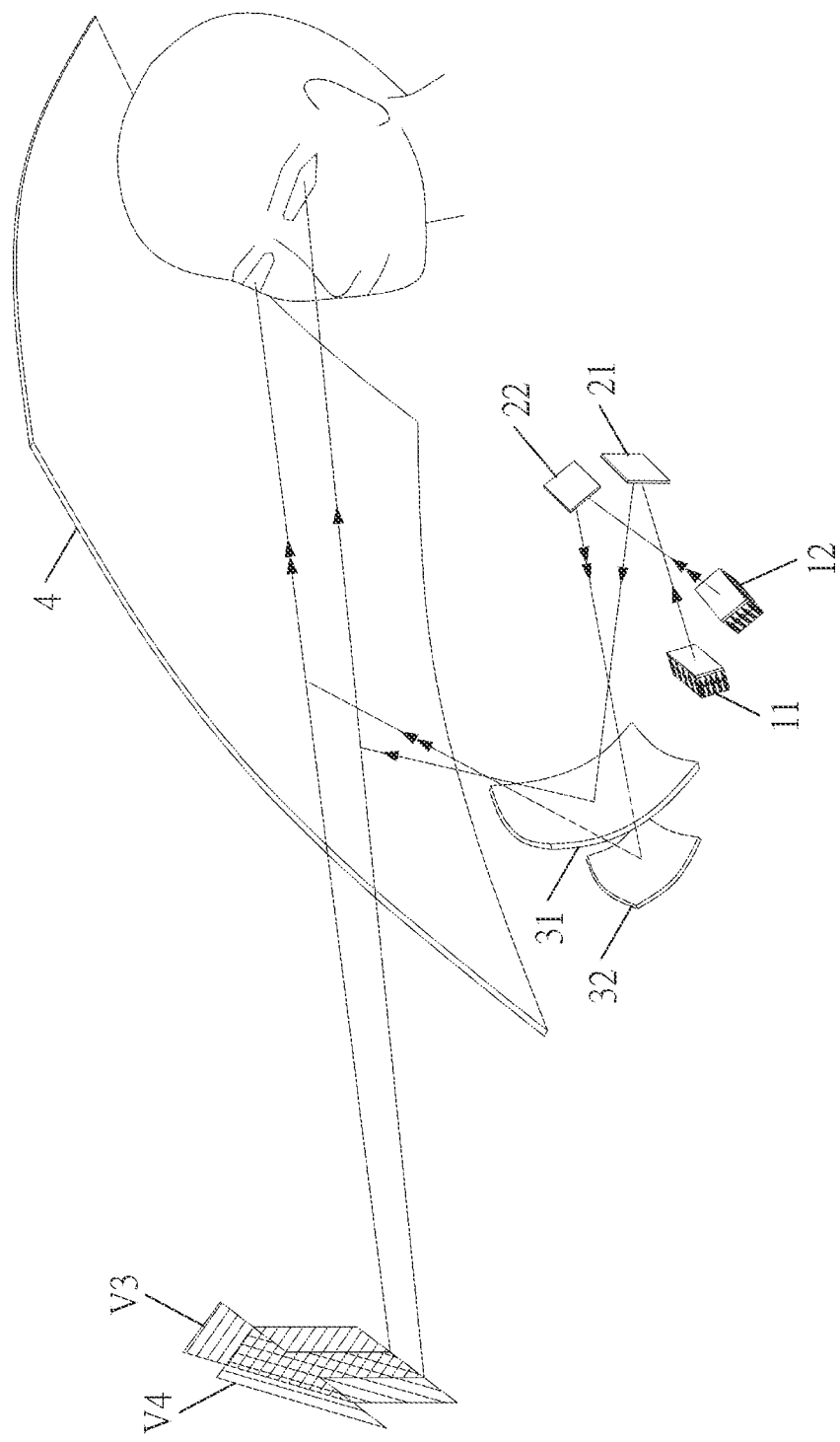
FIG. 14 is a schematic diagram showing the equal distances between two parallax virtual images and the windshield according to an embodiment of the present invention.

The first light path L1 and the second light path L2 have at least a part of them not overlap before reaching the windshield 4, as shown in FIG. 14. They are not in parallel and intersect each other, or they are not in parallel and do not intersect each other.

In this way, the two image light beams provided by the two directional backlit displays can allow the viewer's left and right eyes to see two parallax virtual images V3 and V4 (ie, a left-eye parallax virtual image and a right-eye parallax virtual image) respectively, and the two parallax virtual images are combined visually (that is, in the viewer's mind) into a stereoscopic image SV. Visually, this stereoscopic image SV looks like an image appearing in front of the windshield 4 (that is, the viewer's eyes EYES and the stereoscopic image SV are respectively located at opposite sides of the windshield 4).

Figure 8B:
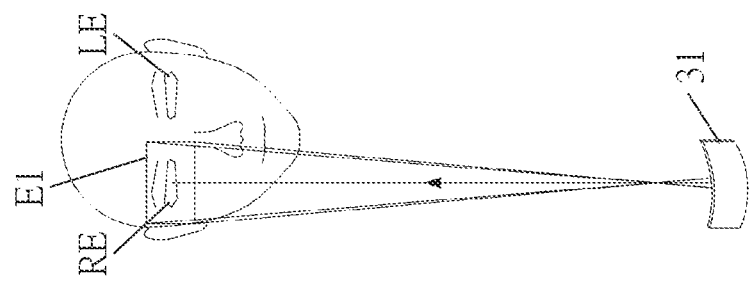
FIG. 8B is a schematic diagram of the image light beam of FIG. 8A being projected to the right eye box of the right eye.
Figure 8A:
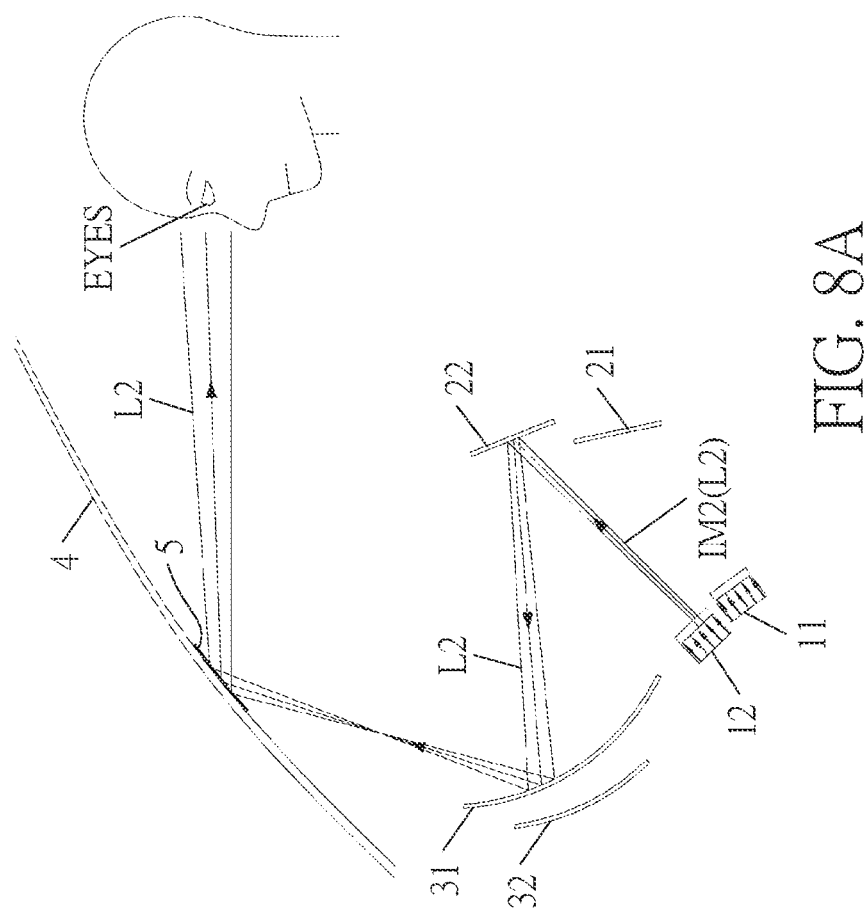
FIG. 8A is a schematic diagram of an image light beam of the directional backlit display in FIG. 5 projected toward the right eye through its light path.

In the example of the directional backlit display of the present invention as shown in FIGS. 6 and 7, the full width at half maximum (FWHM) of the output light field of the backlight module of each directional backlit display as shown in FIGS. 8A and 8B is about ±5°~±10°, which narrows the viewing angle of the display screen, so that an eye box (such as the eye box E1) formed by the light of respective pixels of the display screen projected, reflected, and magnified in the light path (such as the second light path L2) covers only one eye (such as the right eye RE), but does not cover the other eye (e.g. the left eye LE). In addition, the width of the eye box formed by the light of a respective directional backlit display projected on distance corresponding to the viewer's eyes can be approximately the spacing between the pupils of the two eyes, that is, about 6.5~7.0 cm.

Figure 9B:
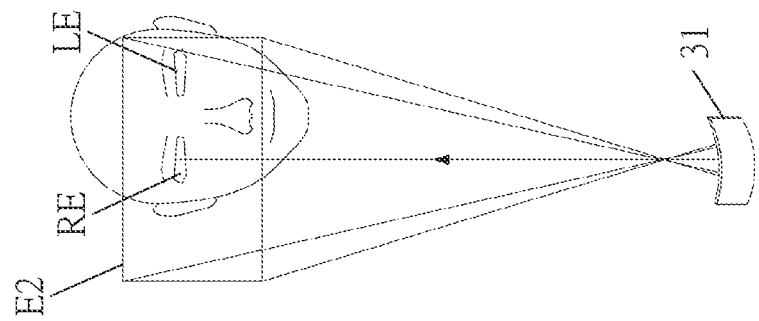
FIG. 9B is a schematic diagram of the image light beam of FIG. 9A being projected to the right eye box of the right eye.
Figure 9A:
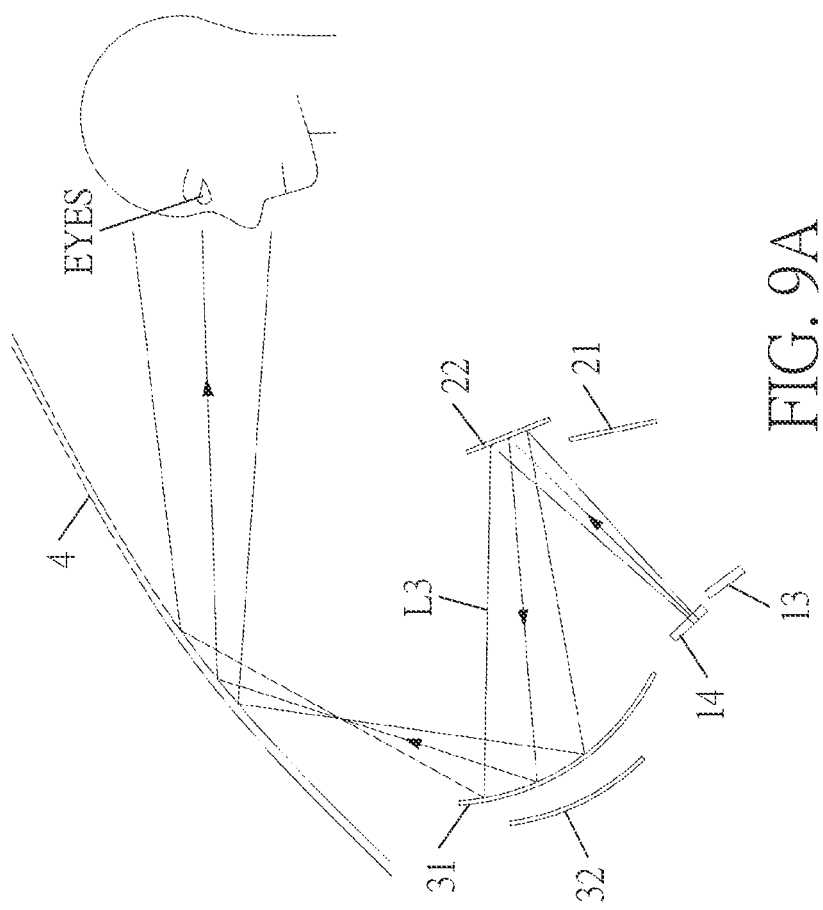
FIG. 9A is a schematic diagram of an image light beam of a non-directional backlit display projected toward the right eye through its light path.

Compared with the directional backlit displays used in the present invention, if the directional backlit displays of FIG. 8A are replaced with the commonly used non-directional backlit displays 13 and 14 shown in FIG. 9A, the FWHM of the output light field of the backlight source is about ±30°~±60°, so the display screen can have a wide viewing angle, but the eye box E2 formed by the light of respective pixels of the display screen projected, reflected, and magnified in the light path L3 becomes too large and covers not only one eye (for example, the right eye RE) but also the other eye (for example, the left eye LE), as shown in FIG. 9B. Therefore, when both the left eye and the right eye see the same parallax virtual image, crosstalk occurs to affect the quality of the stereoscopic image.

Figure 10:
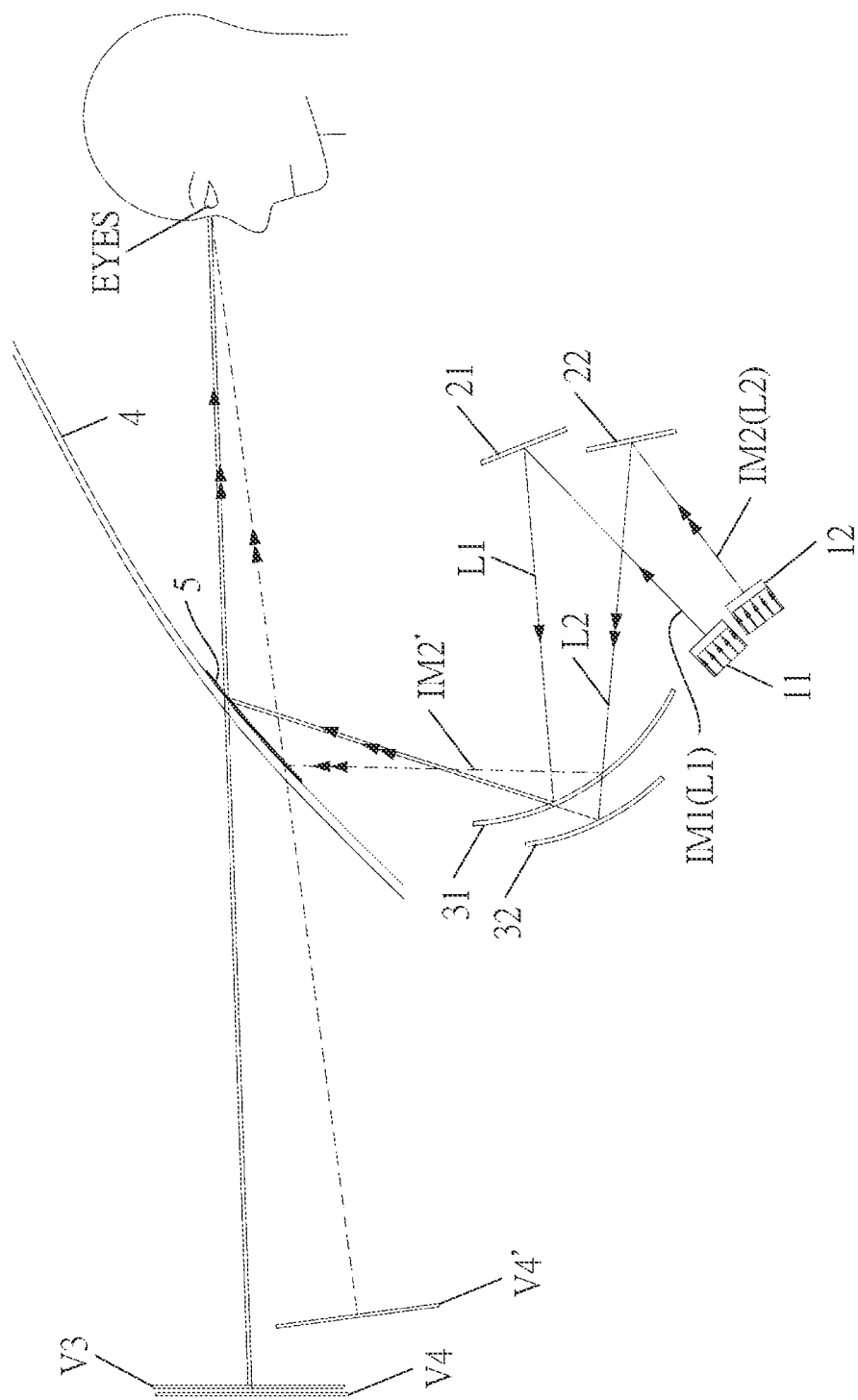
FIG. 10 is a schematic diagram of light leakage or crosstalk caused by a part of the second image light beam reflected by a reflective polarizer serving as a beam splitter.

In addition, in this embodiment or other embodiments, the beam splitter 31 is a reflective polarizer. As shown in FIG. 10, the first image light beam IM1 and the second image light beam IM2 are two polarized image light beams with polarization directions orthogonal to each other. The first image light beam IM1 is projected to the windshield 4 after being reflected by the beam splitter 31. The second image light beam IM2 passes through the beam splitter 31 for the first time and then is reflected back to the beam splitter 31 by the third reflector 32, so that the second image light beam IM2 passes through the beam splitter 31 for the second time before projected to the windshield 4. However, the transmittance of the beam splitter 31 for the second image light beam IM2 is not 100%. Although most of the second image light beam IM2 passes through the beam splitter 31, a small part of the second image light beam IM2 is still reflected to the windshield 4 by the beam splitter 31, resulting in incomplete light splitting. If the first light path L1 of the first image light beam IM1 and the second light path L2 of the second image light beam IM2 are approximately in parallel with each other, their incident angles on the beam splitter 31 will be similar, a small part of the second image light beam IM2 (i.e., the second image light beam IM2') reflected by the beam splitter 31 is reflected by the windshield 4 and then enters either eye of the viewer to form one another parallax virtual image V4', therefore result in the light leakage problem, i.e., one of the viewer's eyes sees two identical parallax virtual images V4 (Target virtual image) and V4', or the crosstalk problem, i.e., the other of the viewer's eyes sees two different parallax virtual images V3 (target virtual image) and V4'.

Figure 11:
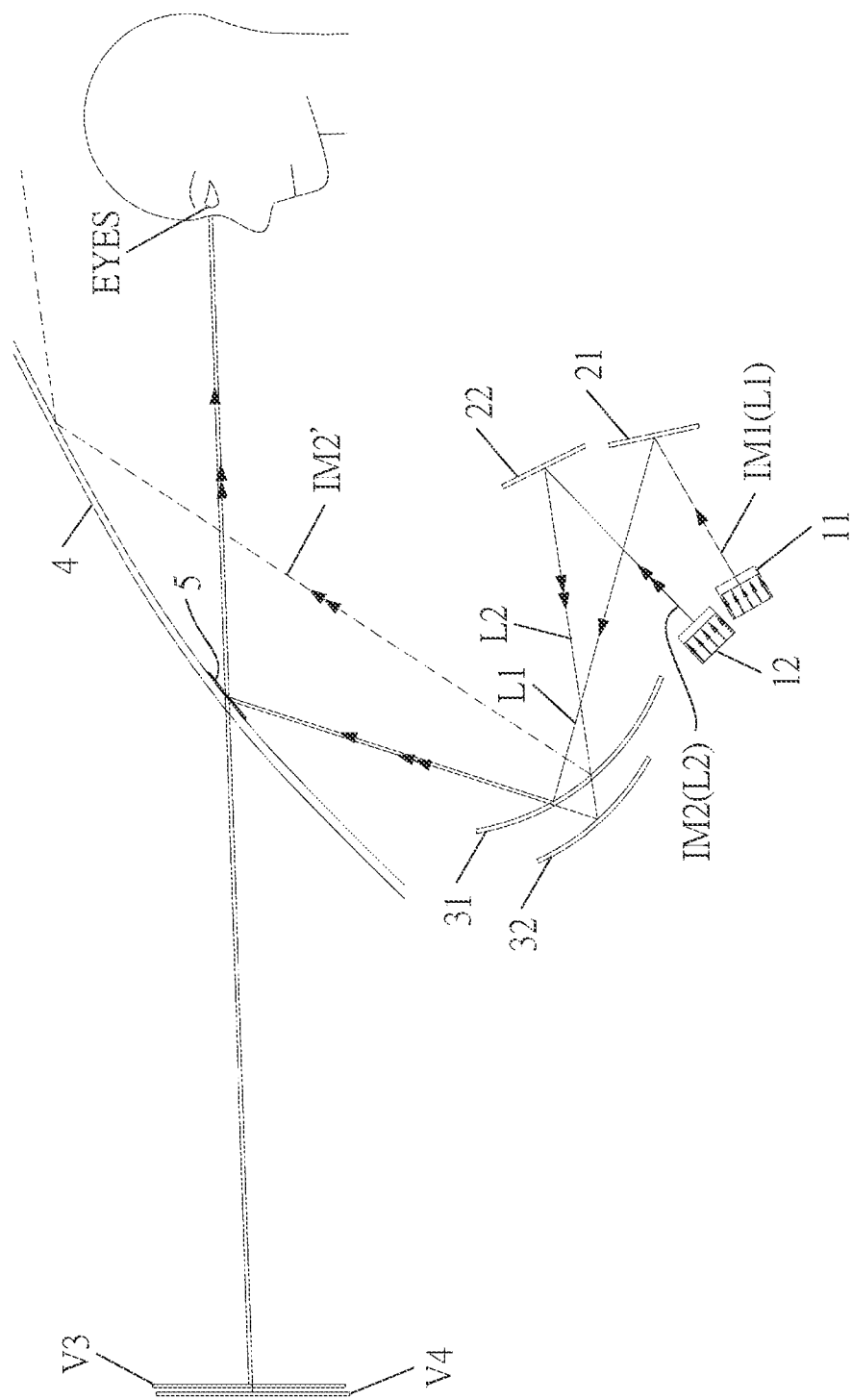
FIG. 11 is a schematic diagram of a single interlacing design of light paths on the first light path and the second light path according to an embodiment of the present invention.
Figure 19:
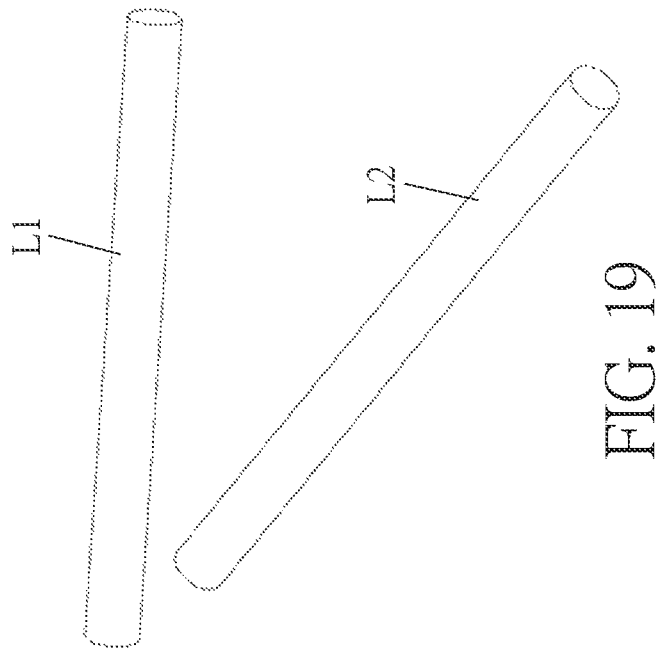
FIG. 19 is a schematic diagram showing the first light path and the second light path that are not in parallel with each other and do not intersect each other according to an embodiment of the present invention.
Figure 18:
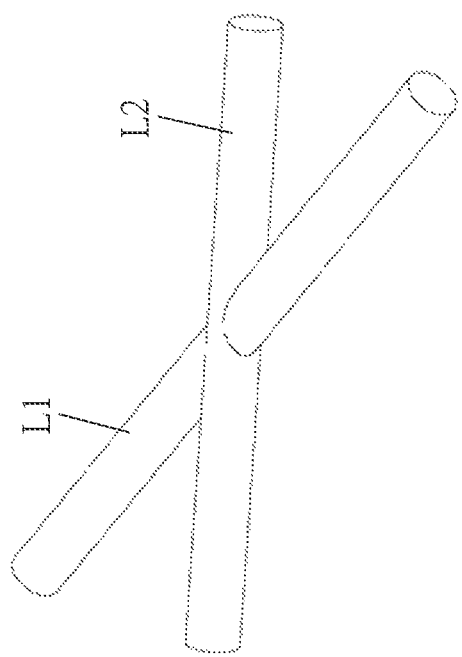
FIG. 18 is a schematic diagram showing the first light path and the second light path that are not in parallel with each other but intersect each other according to an embodiment of the present invention.

In order to solve the above-mentioned light leakage and crosstalk problems, in this embodiment or other embodiments, as shown in FIGS. 5 and 11, the first light path L1 between the beam splitter 31 and the first reflector 21 and the second light path L2 between the beam splitter 31 and the second reflector 22 are not in parallel but intersect each other (as shown in FIG. 18), or they are not in parallel but do not intersect each other (as shown in FIG. 19), whereby a single interlacing design of light paths is formed. In this way, the difference of the incident angles of the two light paths at the beam splitter 31 can be increased, so as to enhance the isolation between the light paths. Even if the second image light beam IM2 in the second light path L2 has a small portion (i.e., the second image light beam IM2') reflected by the beam splitter 31, the second image light beam IM2' will not enter into any of the viewer's eyes since its incident angle of the light path at the beam splitter 31 has a large difference from the incident angle of the first light path L1 on the beam splitter 31, thereby avoiding the problems of light leakage and crosstalk. Moreover, cooperation of such light paths and the directional backlit displays can issue a double isolation design of light paths.

Figure 12:
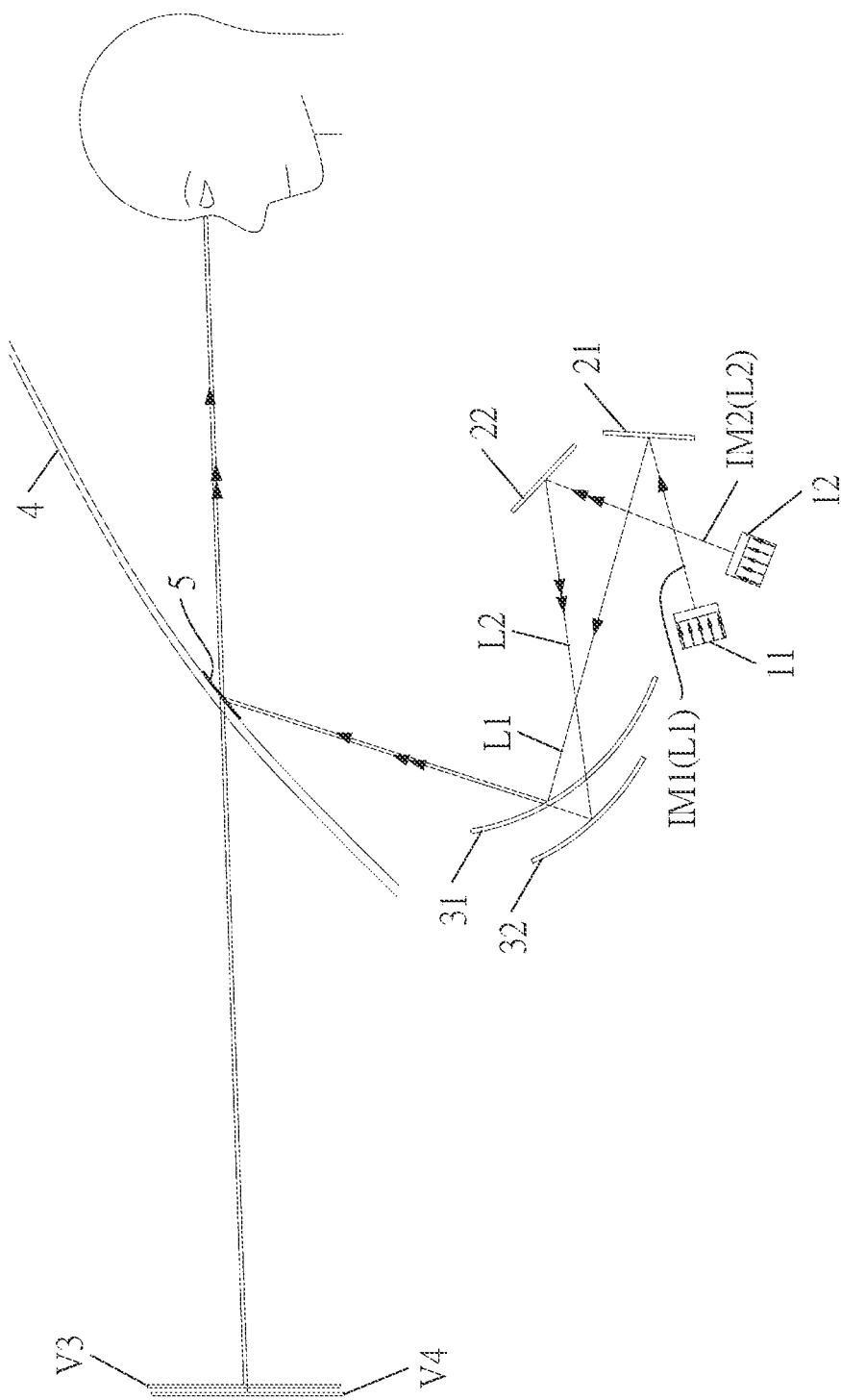
FIG. 12 is a schematic diagram of a dual interlacing design of light paths on the first light path and the second light path according to an embodiment of the present invention.

In order to increase the isolation between the light paths, in another embodiment, likewise the first light path L1 between the first directional backlit display 11 and the first reflector 21 and the second light path L2 between the second directional backlit display 12 and the second reflector 22 may not be in parallel but intersect each other, or they may not be in parallel and do not intersect each other, whereby a dual interlacing design of light paths is formed, as shown in FIG. 12. Therefore, the difference in incident angle between the two light paths on the corresponding reflector is increased, and the isolation between the light paths is strengthened. Furthermore, when the dual interlacing design of light paths cooperates with the directional backlit displays, a triple isolation design of light paths is formed.

Figure 13:
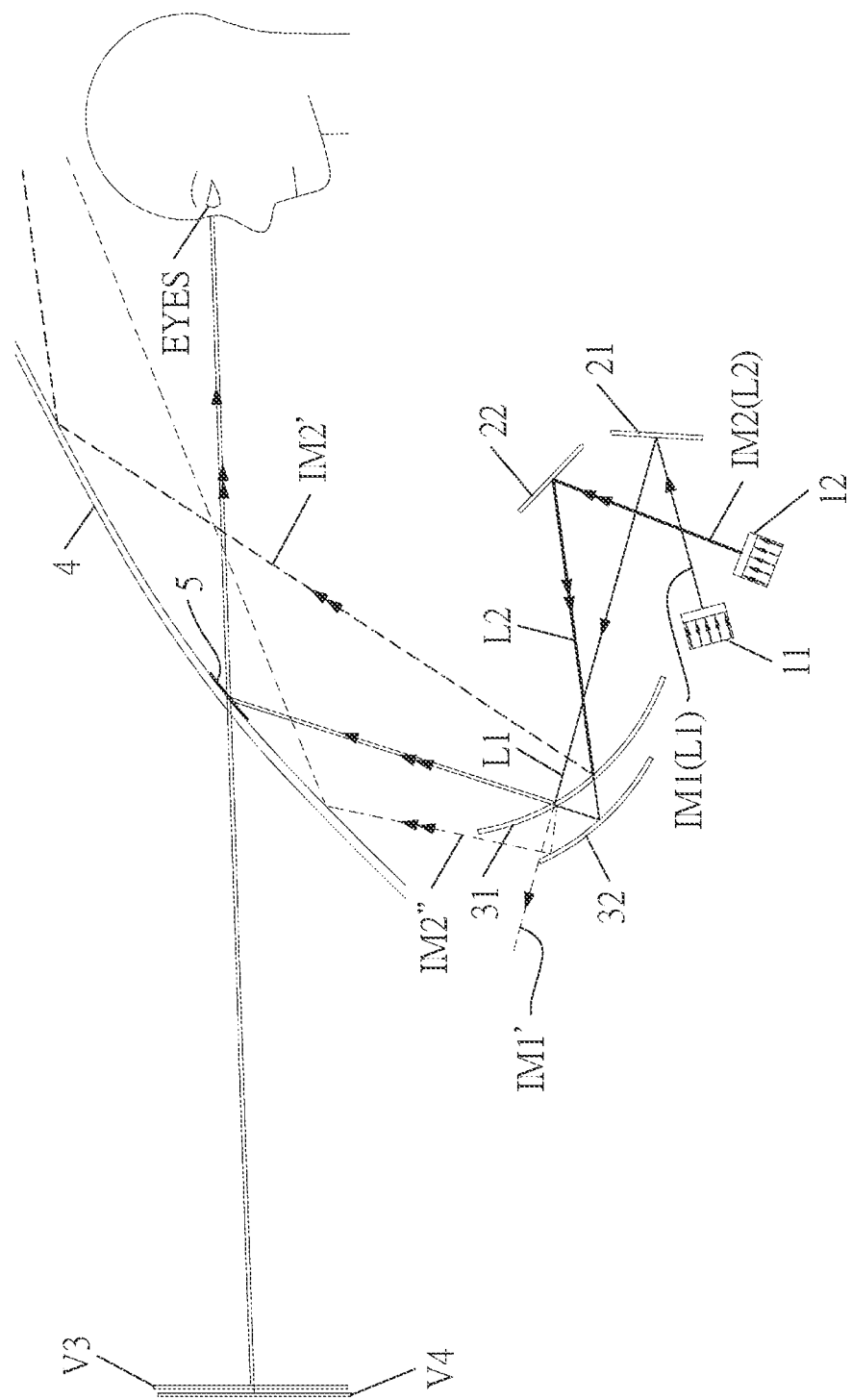
FIG. 13 is a schematic diagram of staggered light paths according to an embodiment of the present invention when a semi-reflective mirror is used as a beam splitter.

In addition to the reflective polarizer, the beam splitter 31 can also be a semi-reflective (for example, semi-reflective and semi-transmissive) mirror, as shown in FIG. 13. In this case, a good light splitting purpose may still be achieved even the image light beams of the directional backlit displays are not light beams whose polarization directions are orthogonal to each other, they can be, for example, unpolarized image light beams instead. The first image light beam IM1 on the first light path L1 is partially reflected by the beam splitter 31 to the windshield 4, and then reflected to one of the eyes of the viewer; and the first image light beam IM1' that passes through the beam splitter 31 does not enter either eye of the viewer due to the difference in the angle of the light paths. A part of the second image light beam IM2 on the second light path L2 passes through the beam splitter 31 for the first time to reach the third reflector 32, and the second image light beam IM2' that is reflected by the beam splitter 31 does not enter any of the viewer's eyes due to the difference in angle of the light paths. Part of the second image light beam IM2 that passes through the beam splitter 31 for the first time continues traveling along the designed light path, and after being reflected by the third reflector 32, this part of the second image light beam IM2 passes through the beam splitter 31 for the second time to reach the windshield 4 and is then projected to the other eye of the viewer. The remaining second image light beam IM2" that is reflected by the beam splitter 31 will not enter any of the viewer's eyes due to the difference in the angle of the light paths. The parallax images for the left and right eyes are respectively projected on the left and right eyes of the viewer, and a stereoscopic image is synthesized with the two parallax images in the viewer's mind to achieve the autostereoscopic effect.

In each embodiment of the present invention, the autostereoscopic head-up display device can further satisfy the following condition:

$$[(D1+S1) \times A1+R1] \times GA=[(D2+S2) \times A2+R2] \times GA,$$

wherein, as shown in FIG. 14, D1 represents a distance from the first directional backlit display 11 to the first reflector 21, D2 represents a distance from the second directional backlit display 12 to the second reflector 22, S1 represents a distance from the first reflector 21 to the beam splitter 31, S2 represents a distance from the second reflector 22 to the third reflector 32, R1 represents a distance from the beam splitter 31 to the windshield 4, R2 represents a distance from the third reflector 32 to the windshield 4, A1 represents a magnification of the beam splitter 31, A2 represents a magnification of the third reflector 32, and GA represents a magnification of the windshield 4. In this way, the distance between the parallax virtual image V3 on the left eye and the windshield 4 and the distance between the parallax virtual image V4 on the right eye and the windshield 4 are equal, so that a stereoscopic image is formed in the viewer's mind.

Figure 15:
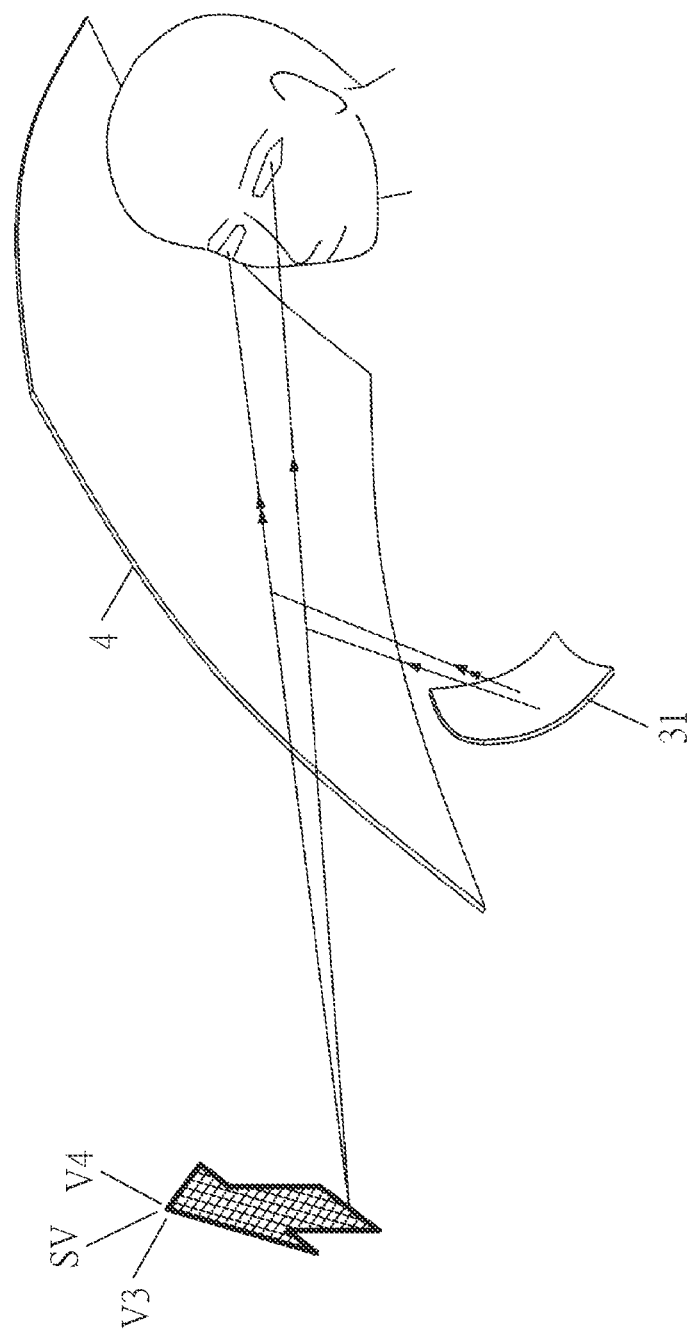
FIG. 15 is a schematic diagram of a zero parallax stereoscopic image formed by two parallax virtual images according to an embodiment of the present invention.
Figure 16:
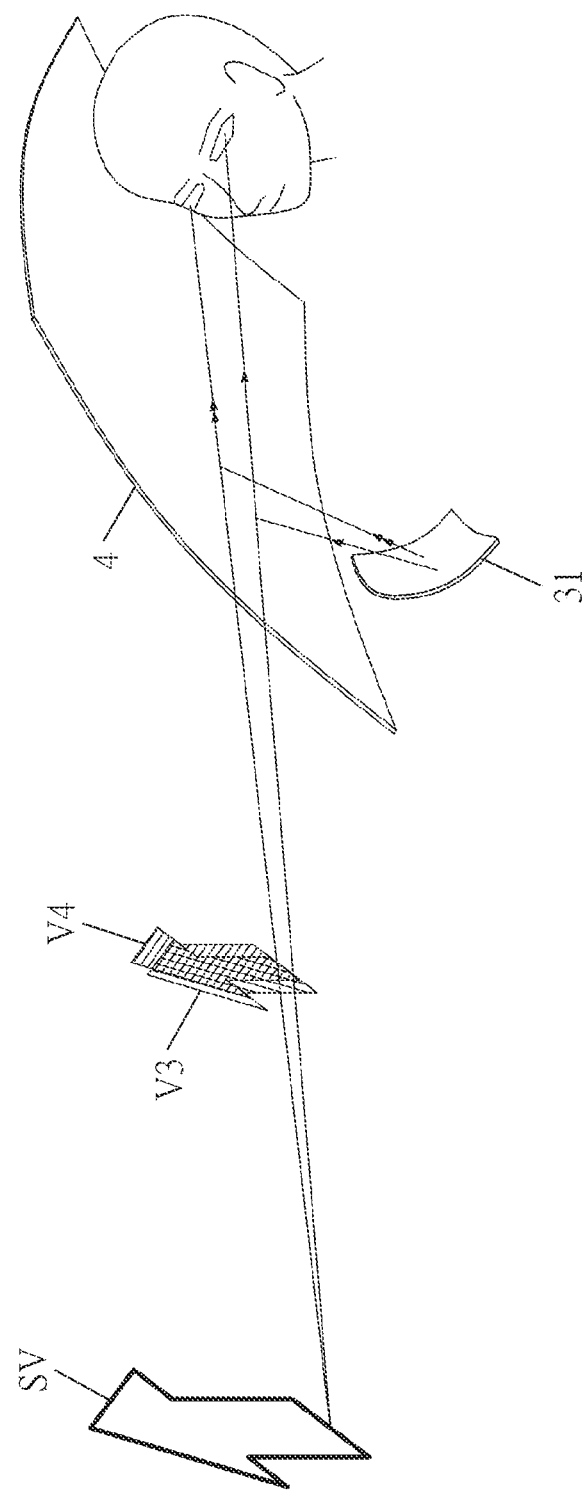
FIG. 16 is a schematic diagram of a positive parallax stereoscopic image formed by two parallax virtual images according to an embodiment of the present invention.
Figure 17:
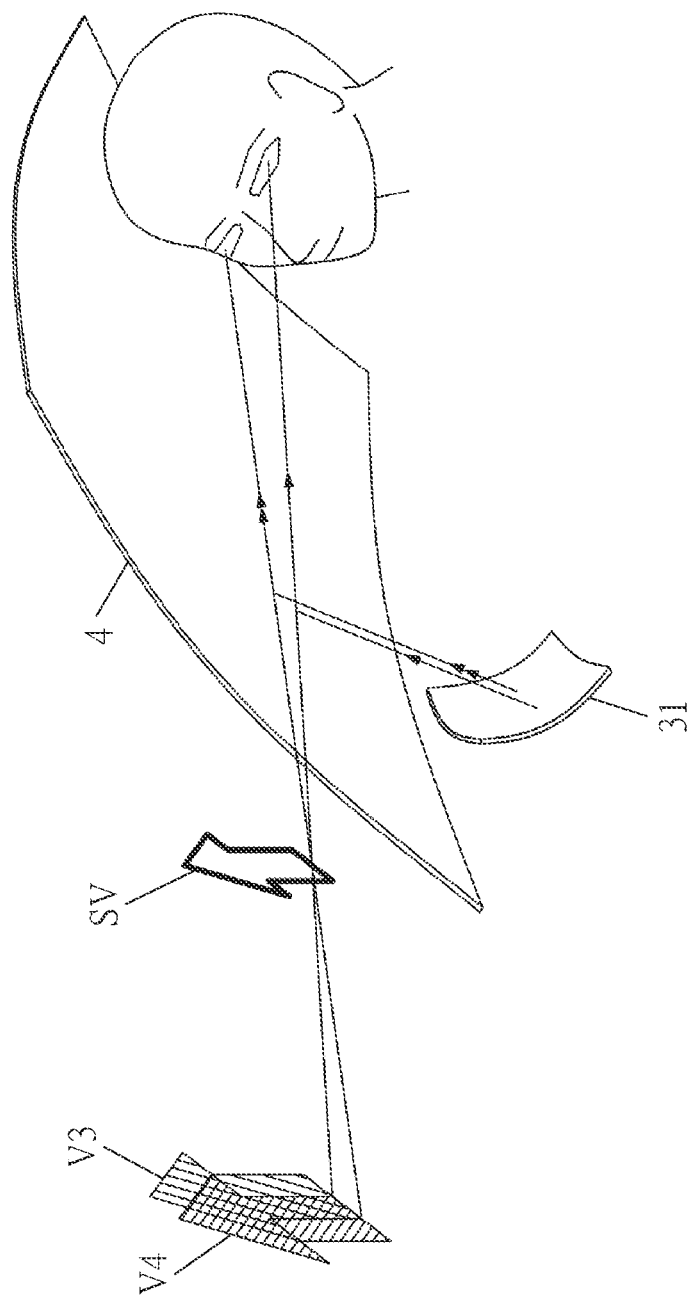
FIG. 17 is a schematic diagram of a negative parallax stereoscopic image formed by two parallax virtual images according to an embodiment of the present invention.

In each embodiment of the present invention, the degrees of interlacing and offset between the first light path L1 and the second light path L2 when being projected to the viewer's eyes will affect the relative positions of the left-eye parallax virtual image and the right-eye parallax virtual image. Therefore, by adjusting and designing the first light path L1 and the second light path L2 according to functional requirements, the two parallax virtual images V3 and V4 of the left and right eyes, as shown in FIG. 15, are fully superimposed together, so that the stereoscopic image SV in the viewer's mind will be at the position of the virtual images and have the same distance to the eyes as the distance from the virtual images to the eyes; and this is zero parallax. Alternatively, as shown in FIG. 16, the two parallax virtual images V3 and V4 of the left and right eyes can be partially superimposed, the left-eye virtual image is offset to the left, and the right-eye virtual image is offset to the right, so that the stereoscopic image SV in the viewer's mind will be behind the positions of the virtual images and have a farther distance to the eyes than the distance from the virtual images to the eyes; and this is positive parallax. Alternatively, as shown in FIG. 17, the two parallax virtual images V3 and V4 of the left and right eyes can be partially superimposed, the left-eye virtual image is offset to the right, and the right-eye virtual image is offset to the left, so that the stereoscopic image SV in the viewer's mind will be in front of the virtual images and have a shorter distance to the eyes than the distance from the virtual images to the eyes; and this is negative parallax.

In each embodiment of the present invention, the autostereoscopic head-up display device further includes a semi-transmissive reflective film 5 disposed on the windshield 4, as shown in FIG. 5. The semi-transmissive reflective film 5 is used to reflect the first image light beam IM1 and the second image light beam IM2 to the left and right eyes of the viewer, respectively. In this way, the reflectivity of the screen projection can be increased.

Although the present invention is disclosed above with the foregoing embodiments, these embodiments are not intended to limit the present invention. Without departing from the spirit and scope of the present invention, all modifications and combinations of various implementation modes full within the scope of patent protection of the present invention. For the scope of protection defined by the present invention, please refer to the attached claims.

What is claimed is:

1. An autostereoscopic head-up display device using two directional backlit displays, comprising:
    a first directional backlit display configured to provide a first image light beam with directivity;
    a second directional backlit display configured to provide a second image light beam with directivity, wherein the first image light beam and the second image light beam are parallax image light beams to be respectively projected on eyes of a viewer;
    a first reflector;
    a second reflector;
    a third reflector; and
    a beam splitter located between the first reflector, the second reflector and the third reflector;
    wherein the first directional backlit display, the first reflector, the beam splitter, a windshield, and one of the viewer's eyes form a first light path, the first image light beam projected by the first directional backlit display is projected to one of the viewer's eyes via the first light path to form a parallax virtual image;
    the second directional backlit display, the second reflector, the beam splitter, the third reflector, the windshield and the other of the viewer's eyes form a second light path, the second image light beam projected by the second directional backlit display is projected to the other of the viewer's eyes via the second light path to form another parallax virtual image, the two parallax virtual images together form a stereoscopic image in the viewer's vision; and
    the first light path and the second light path between the beam splitter and the first and second reflectors are not in parallel with each other.

2. The autostereoscopic head-up display device as claimed in claim 1, wherein the first light path and the second light path intersect each other between the beam splitter, the first reflector and the second reflector.

3. The autostereoscopic head-up display device as claimed in claim 1, wherein the first light path and the second light path do not intersect each other between the beam splitter, the first reflector and the second reflector.

4. The autostereoscopic head-up display device as claimed in claim 1, wherein the first light path and the second light path are not in parallel and intersect each other between the first and second directional backlit displays and the first and second reflectors.

5. The autostereoscopic head-up display device as claimed in claim 1, wherein the first light path and the second light path are not in parallel and do not intersect each other between the first and second directional backlit displays and the first and second reflectors.

6. The autostereoscopic head-up display device as claimed in claim 1, wherein the first light path and the second light path have at least a part of them not overlap and not in parallel with each other before reaching the windshield.

7. The autostereoscopic head-up display device as claimed in claim 1, wherein the beam splitter is a reflective polarizer, and the first image light beam and the second image light beam projected to the beam splitter are image light beams whose polarization directions are orthogonal to each other.

8. The autostereoscopic head-up display device as claimed in claim 1, wherein the beam splitter is a semi-reflective mirror, and the first image light beam and the second image light beam projected to the beam splitter are unpolarized image light beams.

9. The autostereoscopic head-up display device as claimed in claim 1, wherein a distance from the first directional backlit display to the first reflector is D1, a distance from the second directional backlit display to the second reflector is D2, a distance from the first reflector to the beam splitter is S1, a distance from the second reflector to the third reflector is S2, a distance from the beam splitter to the windshield is R1, a distance from the third reflector to the windshield is R2, a magnification of the beam splitter is A1, a magnification of the third reflector is A2, a magnification of the windshield is GA, and the autostereoscopic head-up display device satisfies the following condition:

$$[(D1+S1) \times A1+R1] \times GA = [(D2+S2) \times A2+R2] \times GA.$$

10. The autostereoscopic head-up display device as claimed in claim 1, wherein the first directional backlit display and the second directional backlit display each include a liquid crystal panel and a directional backlight source.

* * * * *